Figure 1:
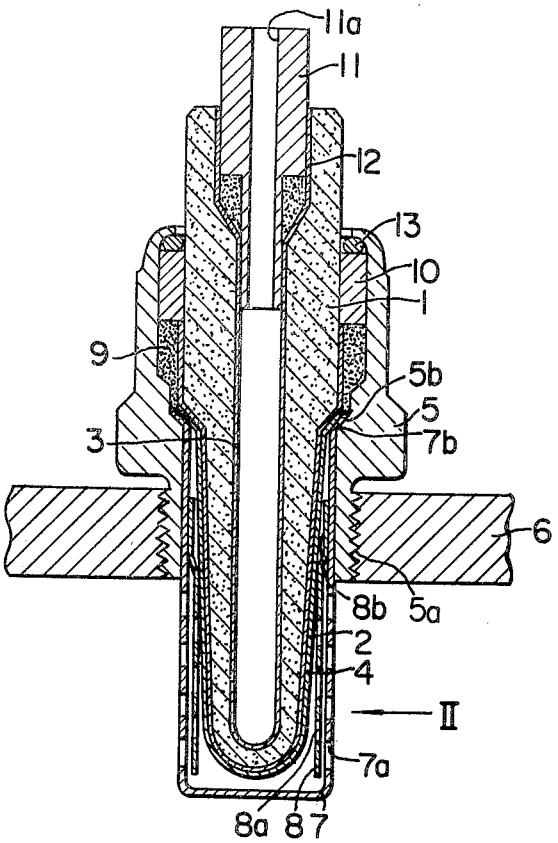
Figure 2:
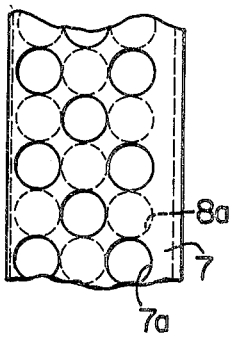
Figure 3:
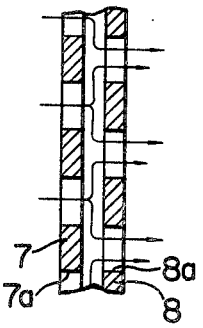
Figure 4:
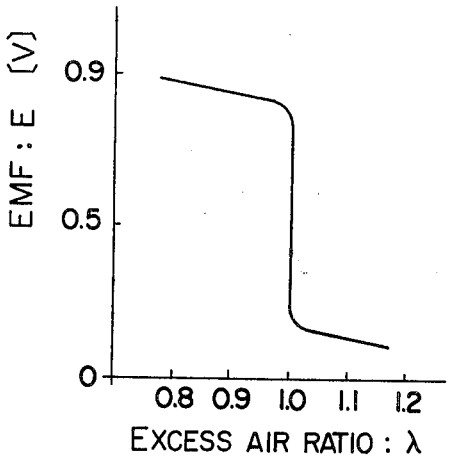
Figure 5:
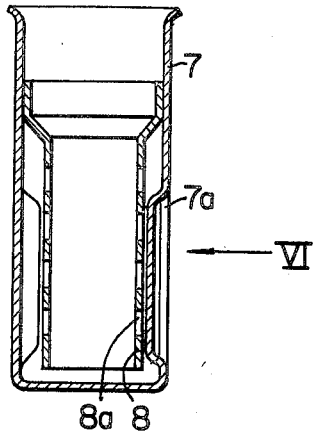
Figure 6:
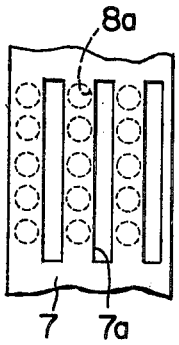
Figure 7:
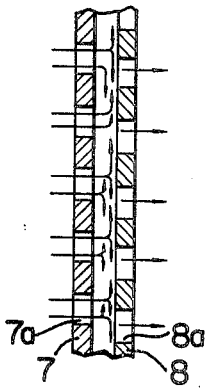

United States Defensive Publication [19] (H) [11] T983,005

Akiyama et al. [43] Jun. 5, 1979

[54] OXYGEN CONCENTRATION DETECTOR

[75] Inventors: Yoshinori Akiyama, Kariya; Masami Ouki, Nagoya; Masatosi Suzuki, Kariya, all of Japan

[73] Assignee: Nippondenso Co. Ltd., Kariya, Japan

[21] Appl. No.: 890,904

[22] Filed: Mar. 27, 1978

[51] Int. Cl.[2] ..... G01N 27/46

[52] U.S. Cl. ..... 204/195 S

[57] ABSTRACT

An improved oxygen concentration detector is described having an oxygen concentration sensor which produces an electromotive force in accordance with a difference between an oxygen concentration in the gas components of a gas under test and an oxygen concentration in a reference gas, and first and second electrodes formed on the gas-under-test side and the reference gas side, respectively, of the oxygen concentration sensor, so that the electromotive force produced by the oxygen concentration sensor is taken across the two electrodes, in which the improvement comprises a first protective member arranged to cover the first electrode on the oxygen concentration sensor and having a number of pores through which the gas under test can pass, and a second protective member arranged between the first electrode and the first protective member also having a number of pores through which the gas under test can pass. The first and second protective members are spaced apart from each other to form a gap between them and the pores of the first protective member and the pores of the second protective member are arranged in a staggered relationship to each other.

The pores of the first protective member may have a louvered shape or the pores of the two protective members may partially overlap each other. The pore sizes for both of the protective members are preferably in the range of 0.5 mm to 3.0 mm.

The detector assembly is effective in reducing the flow rate of the gas under test within the exposed detector so that the underlying electrode is not substantially peeled off.

4 Claims, 2 Sheets Drawing,

21 Pages Specification

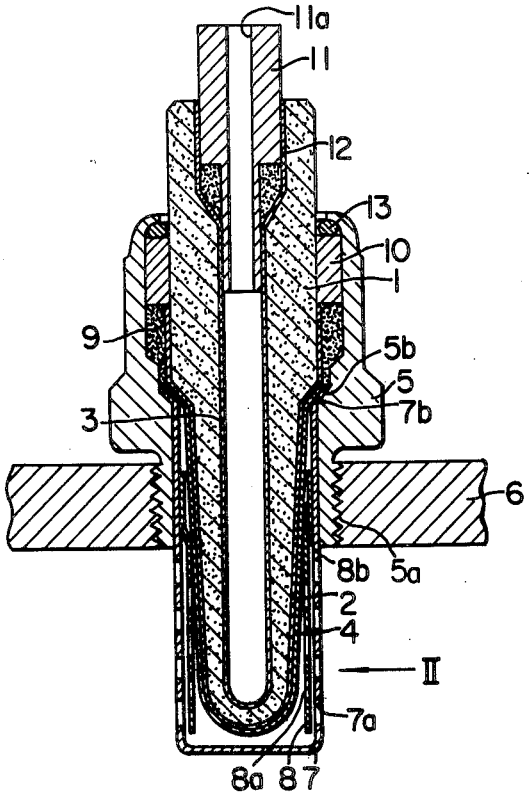

The file of this unexamined application may be inspected and copies thereof may be purchased (849 O.G. 1221, Apr. 9, 1968).